Dec. 27, 1955  C. E. KIERNAN ET AL  2,728,703
METHOD OF COATING SHEET METAL WITH PLASTIC
Filed March 14, 1952
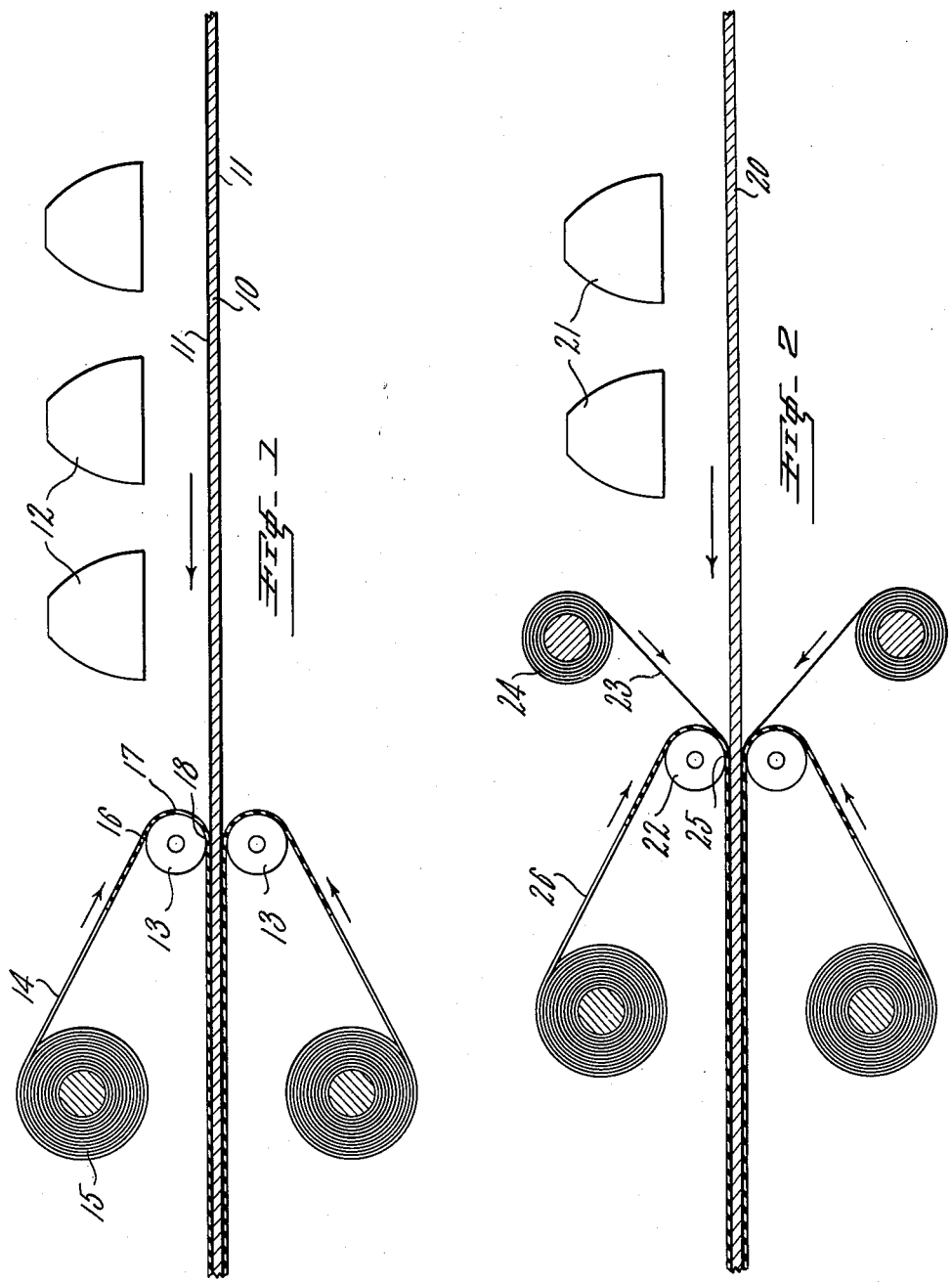
INVENTORS
CONLETH E. KIERNAN
WILLIAM F. FISCHER
BY James J. Long
AGENT sides of the metal in a single treatment, of a film greater in thickness than could be obtained by a single application of a fluid vinyl coating composition.

United States Patent Office 2,728,703
Patented Dec. 27, 1955

2,728,703

METHOD OF COATING SHEET METAL WITH PLASTIC

Conleth E. Kiernan, Naugatuck, and William K. Fischer, Woodbury, Conn., assignors to United States Rubber Company, New York, N. Y., a corporation of New Jersey Application March 14, 1952, Serial No. 276,574

1 Claim. (Cl. 154—130)

This invention relates to the method of coating sheet metal with plastic, and more particularly it relates to a method of providing large areas of sheet metal with an integral, firmly adherent, protective coating, comprising a vinyl film smoothly and uniformly applied to the surface of the metal.

One object of the invention is to provide a method for applying a protective vinyl film to a continuous length of sheet metal.

Another object is to provide a convenient method of firmly adhering a vinyl film to a sheet metal surface.

Still another object is to provide sheet metal with thicker, more dense, coatings of vinyl film than it has heretofore been considered possible to apply to large areas of sheet metal without encountering difficulties from formation of wrinkles or other discontinuities in the surface of the film.

A further object of the invention is to provide large areas of sheet metal with a protective vinyl film of a thickness sufficient to provide for effective electrical insulation of the metal.

Still a further object is to provide a method for firmly bonding to a metal surface a vinyl film that is unusually free of voids and pinholes, and therefore provides high electrical and chemical resistivity, as well as excellent protection of the metal from oxidation and other corrosive effects.

It is still another object of the invention to provide an intimate bond between a vinyl plastic and a base metal that is sufficiently adherent to withstand mechanical working and drawing as by stamping, bending, crimping and flexing.

The manner in which the invention accomplishes the foregoing objects, as well as additional objects and advantages, will be made manifest in the following detailed description of the invention which is intended to be read with reference to the accompanying drawings, wherein:

Fig. 1 is a schematic elevational view of one method of carrying out the invention; and Fig. 2 is a similar view of a modified method.

The invention is particularly applicable to sheets of metal of large area, or continuous sheets of metal, such as sheet steel. Previously, the only satisfactory known methods of providing protective or decorative coatings of vinyl resin on such sheets has been to apply a liquid vinyl coating composition to the surface of the metal, as by brushing, dipping or spraying. Such processes require a period of air drying or baking to remove the solvent to harden the film. By such means, films of only limited thickness, i. e., usually from 1 to 1.5 mils, can be applied. To provide greater thicknesses than this it is necessary to build up the film by repeated applications of the coating, which is time-consuming, inconvenient, and relatively expensive. The present invention applies a vinyl film to the surface of the sheet metal in the form of a preformed film of vinyl resin, and permits a film of virtually any desired thickness to be applied to the surface of the metal, and especially it permits the application to both sides of the metal in a single treatment, of a film greater in thickness than could be obtained by a single application of a fluid vinyl coating composition.

In carrying out the invention the sheet of metal is first cleaned, and preferably etched with acid or sand-blasted to produce a roughened surface, to promote greater adhesion. The surface of the metal is then coated with an adhesive comprising a thermoplastic resin dissolved in a solvent, by brushing, spraying or dipping. Prior to coating with the adhesive, the metal surface may also be passivated with chromic acid or phosphoric acid to inhibit rusting. In place of applying the thermoplastic adhesive from a solution, the adhesive may be applied in the form of a preformed unsupported thin film in a manner that will be described in detail below. The metal sheet coated with the thermoplastic adhesive is heated to a temperature within the range of 200 to 450° F. There is then provided an unsupported film of vinyl resin, such as a conventionally formed plasticized polyvinyl chloride sheet, which is heated to a temperature within the range from 250 to 300° F., to render the vinyl film soft and limp. It is essential that as the film is heated to this soft and limp state it be prevented from developing wrinkles or buckles, or from becoming otherwise undesirably distorted, and most suitably such wrinkling or distortion is prevented by supporting the entire vinyl film over its entire surface area as it is heated, and preferably there is at the same time a moderate uniform tension applied to the film. With the vinyl film in a soft, limp, heated state, and supported against wrinkling, the film is pressed firmly continuously against the surface of the preheated metal sheet carrying the layer of adhesive. As the vinyl film is pressed against the surface of the metal sheet the moderate tension in the film is released uniformly to deposit the heated film uniformly and evenly onto the surface of the thermoplastic heated adhesive. The vinyl film is preferably initially contacted with the adhesive surface with a rolling motion, in such manner that air is uniformly expelled or excluded from between the vinyl film and the adhesive. It is found that when the heated vinyl film and heated metal carrying the soft heated thermoplastic adhesive are united in this manner, the bond between the metal and the vinyl film is so strong that the assembly can be worked extensively, without separation or cracking of the film.

Referring to the drawing, Fig. 1 shows a sheet 10 of steel being coated by the present process. The sheet 10 is continuously advanced in the direction indicated by the arrow at a moderately rapid rate, e. g., at a rate of 60 feet per minute. The steel surfaces have previously been coated with a suitable thermoplastic adhesive composition, which has been allowed to become essentially dry or hard, and the sheet containing such adhesive 11 on its surface is passed before a bank of infra red lamps 12 which heat the steel sufficiently to make the adhesive coating thereon soft and receptive. This heating also removes the last traces of solvent from the adhesive cement. Satisfactory results have been found possible by heating the steel to a temperature within the range from 200 to 450° F., and with the usual thermoplastic adhesive compositions, it is usually found more satisfactory to heat the steel to about 325° F. The thus heated steel is thereafter passed between the nip of two closely spaced upper and lower heated pressure rollers 13, where the previously prepared preheated vinyl film 14 is applied to the soft adhesive 11. The vinyl film, suitably in the form of a continuous roll 15 of calendered vinyl sheeting, is fed continuously under moderate uniform tension to the heated pressure rollers 13. As the vinyl film 14 contacts the upper surface 16 of the pressure roller it becomes heated to a soft, limp state. The supply roll 15 of vinyl film and the pressure roll 13 are driven by suitable means (not shown) in such manner that the film 14 is maintained under a moderate tension, and as the film 14 passes around the surface 17 of the heated pressure roller it is effectively supported thereby against wrinkling or distortion, with the result that it is applied in a perfectly even fashion to the adhesive surface 11.

As the heated film advances into the nip 18 at the lower surface of the roller it is pressed firmly against the adhesive surface 11 in what is in effect a relative rolling motion that effectively expels any air from between the vinyl film 14 and the adhesive 11. Since both the film 14 and the adhesive 11 are in the heated, soft, receptive state, they become firmly adhered together under the influence of pressure applied by the heated roller 13. The pressure rollers are suitably heated to a temperature of about 250 to 300° F., and the rolls are preferably so adjusted that they exert a pressure of about 50 p. s. i. on the vinyl film against the adhesive coated steel.

After the assembly of sheet steel, adhesive, and vinyl film passes through the nip between the heated pressure rollers it may be allowed to cool without further treatment, and it is found that the film is perfectly uniformly applied to the steel, and that there is unusual tenacity between the steel and the film, that permits the assembly to be subjected to considerable mechanical working and drawing, as by stamping, bending, crimping and flexing without loss of adhesion of the plastic to the metal, using conventional metal working equipment.

In Fig. 2 we show a modification of the invention in which a continuously advanced sheet 20 of steel is heated by banks 21 of infrared lamps, as previously described, and passed in the heated state between upper and lower heated pressure rollers 22. In this modification, an adhesive film is applied to both sides of the steel sheet in the form of a cast film 23, supplied from a suitable supply roll 24. The cast adhesive film 23 is suitably composed of polyvinyl acetate-chloride copolymer modified by a small amount of maleic anhydride, and admixed with an equal weight of acrylonitrile-butadiene rubber. The adhesive film 23 is fed into the nip 25 between the pressure roller 22 and the steel sheet 20 simultaneously with an advancing vinyl film 26, and the two films are united to the steel under the influence of heat and pressure in the same manner as described above in connection with Fig. 1.

The following examples will illustrate the invention in more detail. In the examples the formulations are expressed in parts by weight.

*Example 1*

Strips of clean steel were etched with 10% nitric acid for five to ten seconds, and after rinsing and drying, were covered with an adhesive having the composition:

| | |
|---|---|
| Polyvinyl acetate-chloride copolymer having the composition 12% polyvinyl acetate, 87% polyvinyl chloride and 1% maleic anhydride and a molecular weight of 10,000–15,000 | 11.3 |
| Polybutyl methacrylate | 13.1 |
| Polyisobutyl methacrylate | 5.6 |
| Butyl acetate | 21. |
| Methyl isobutyl ketone | 21. |
| Toluol | 14. |
| Propylene oxide | 3.5 |
| Ethyl acetate | 13.65 |

The coated steel was then passed through a heat zone to remove the solvent from the adhesive composition and to bring the metal to a temperature of 325° F. The heated steel was passed from the heat zone immediately through the nip of pressure rollers heated to 250° F. Simultaneously with the sheet metal, sheets of polyvinyl chloride were passed through the nip whereby a combining operation was effected. The polyvinyl chloride sheet had the composition:

| | |
|---|---|
| Polyvinyl chloride (35,000 ave. mol. wt.) | 100 |
| Tricresyl phosphate | 15 |
| Dioctyl phthalate | 15 |
| Lead stearate | 1.5 |
| High molecular weight alcohol wax | 1.5 |
| Lead silicate | 5. |
| Lead phosphite | 1.5 |
| Stearic acid | 0.25 |
| Pigment | 5.0 |

The resulting coating on the metal was approximately 9 mils thick (1 mil representing the thickness of the adhesive, and 8 mils representing the thickness of the vinyl film). The film applied in this way showed adequate electrical resistivity as determined by a standard spark test in which 20,000 volts electrical potential was applied across the film without deleterious effect. Also, samples of the thus coated steel were crimped, bent, stamped and drawn without breaking the film. Similar results were obtained with etched steel, phosphoric acid treated steel, iron phosphate treated steel, phosphoric acid treated aluminum, hydrochloric acid (10%) treated copper, or zinc coated phosphoric acid treated steel.

*Example 2*

Strips of clean steel were processed as described in Example 1, using as the adhesive:

| | Parts |
|---|---|
| Polyvinyl chloride-acetate (87/12) copolymer modified with 1% maleic anhydride | 10 |
| Acrylonitrile-butadiene rubbery copolymer (35/65) | 10 |
| Methyl ethyl ketone | 60 |
| Methyl isobutyl ketone | 20 |
| | 100 |

The polyvinyl chloride film had the composition:

| | Parts |
|---|---|
| Polyvinyl chloride | 100 |
| Polyvinyl alcohol | 2 |
| Carnauba wax | 4 |
| Dibasic lead phosphite | 0.5 |
| Tribasic lead sulfate | 20 |
| Pigment | 10 |

The resulting film which was about 9 mils thick had an adhesive strength of at least 20 pounds per linear inch width.

The thermoplastic vinyl resin films which can be employed in the invention include not only vinyl chloride itself, but also include vinyl chloride modified with other ingredients, as by copolymerizing therewith vinylidene chloride or vinyl acetate, or vinyl chloride polymers modified by admixing therewith acrylonitrile-butadiene copolymers. The vinyl film is usually plasticized, but film containing little or no plasticizer may also be used.

An additional advantageous feature of the composite articles made in accordance with the invention is that the laminate of vinyl film and metal actually has a lower brittle point than that of the unbonded plastic film, due to the reinforcing effect of the firmly adhered metal. It has also been observed that higher heat distortion temperature is provided in the metal-vinyl film laminate, than in the unsupported vinyl film.

The process of the invention is capable of producing a product that is unique in its ability to be after-formed, because of the superior adhesion obtained. For the purpose of producing a product capable of being after-formed, there is employed as the adhesive a composition comprising a polyvinyl chloride-acetate copolymer which is modified by the presence of carboxyl groups, suitably introduced by combining maleic anhydride with the reactants during the copolymerization. The adhesive further preferably contains a polymerized alkyl acrylate or methacrylate. Other modifying agents which may be included in the adhesive composition to impart specific properties include:

1. Chlorinated biphenyl resins of both fluid and solid character.
2. Nitrile rubbers.
3. Partially hydrolyzed polyvinyl chloride-acetate copolymer resins.
4. Drying and non-drying oil-modified alkyd resins.
5. Hiding pigments such as titanium dioxide chromium oxide and others.
6. Inert pigments such as mica, silica, talc, etc.

Adhesives compounded as indicated above are capable of adhering polyvinyl chloride films modified with a wide range of films, pigments, dyes, lubricants and stabilizers.

The superior adhesion obtained with the present process, using an adhesive of the foregoing character, may be demonstrated, for example, by preparing a 6" x 3" x 26 gage steel panel sample, coated by the present method, but having a piece of cellophane or masking tape wound around one end for a distance of approximately 2" prior to application of the vinyl film, so that one end of the film can be lifted free for the adhesion test. The laminate is then laid on a cutting board and cuts are made lengthwise with a sharp blade through the film down to the steel in widths of one inch for the entire 6" length of the laminate. The free end of the film and the free end of the steel are locked in the opposing jaws of a Scott tensile testing machine with the film bent back upon itself at an angle of 180°. The machine is started, pulling the film away from the steel at a 180° angle, and the machine is run at a speed of 2" per minute until the film either breaks or is pulled away from the steel for a length of 3". The force necessary to strip the film from the steel in a sample made according to the invention was 25 lbs. whereas one of the best available prior art process yielded a laminate that stripped at less than 4 lbs. pull.

The importance of the foregoing superior adhesion will be appreciated by consideration of the degree of extreme after-forming which is thereby made possible. Thus, with the laminate of the invention, there is no difficulty about making a 180° seam. This may be done by placing the edge of the laminate between the jaws of a brake press, the upper jaw locking the laminate tightly against the bottom jaw. The top jaw of the press is recessed and the laminate is extended on the bottom jaw to allow for whatever seam depth is desired. The seam is then partially formed by swinging the weighted bottom jaw in a 135° arc, thereby forcing the edge of the laminate ahead of the jaw, until the edge forms a 45° angle with the sheet of laminate, or a 135° angle from its former horizontal position. The seam is finished by placing this partially bent edge between the jaws again, and forcing the bend further until the edge is forced down upon itself at a 180° angle. This is obviously a most severe bending stress. However, it results in no visible detrimental effect on the present laminate, as there is no cracking, wrinkling, or separation of the film. In contrast to this, corresponding laminates made by prior art methods fail under far less severe bending stresses.

The operation known as "reducing crimping," commonly used to reduce the circumference of the male end of a piece of circular duct work, can be performed on the present laminate without injury. This is done by passing the end of the duct several times between a set of toothed rolls, the teeth of which are staggered so that they mesh in gear fashion. The pressure of the top roll forces the metal down between the teeth of the bottom roll so that a series of V grooves are formed in the metal. When the present laminate is subjected to this treatment there is no rupture of the film, and no loss of adhesion. In so far as the inventors are aware, there has never before been known a vinyl-steel laminate capable of undergoing this treatment without failure.

A particularly severe type of after-forming is that involving the production of a "Pittsburgh lock" seam. This is formed by passing the edge of the laminate through a series of rolls arranged in tandem until a flat S-shaped bend is formed. This operation is so severe that in many cases where galvanized metal is passed through the former, particles of zinc are flaked away from the steel. There is no injury to the present laminate.

The laminates made by the present method have been found, by actual factory trials, to withstand successfully the operations performed on a steel container production line. The manufacture of steel containers involves severe deformations incident to drawing, stamping, and forming heads and bottoms, as well as in the flanging of main body sections, and in the rolling and sealing operations involved in clamping the bottoms to the body section.

With the present laminates, there is no difficulty about cold-drawing cups 2¾" in diameter and 1⅜" deep, without any film rupture or adhesion loss. Conventionally made laminates will not withstand any such operation.

Having thus described our invention, what we claim and desire to protect by Letters Patent is:

The method of providing a uniform vinyl film on the surface of a sheet of metal continuously at high speed comprising applying to a surface of the metal sheet a thermoplastic adhesive consisting essentially of (A) vinyl chloride-vinyl acetate copolymer modified by a small amount of maleic anhydride, (B) an essentially equal quantity of butyl methacrylate present only in polymeric form and (C) isobutyl methacrylate present only in polymeric form and equal in amount to about one-half the amount of (A), continuously rapidly advancing the metal sheet through a preheating zone in which the metal and the adhesive coating thereon is preheated to an elevated temperature of about 325° F. to render said adhesive soft and receptive, the said adhesive coating being devoid of solvent, providing a preformed sheet of unsupported vinyl film, continuously rapidly advancing said vinyl film against said advancing preheated solvent-free adhesive-coated metal surface and pressing said vinyl film against said soft and receptive solvent-free adhesive surface at a pressure of about 50 pounds per square inch by rapidly advancing the assembly of vinyl film and metal in said preheated condition through a rotating pressure roll device, subsequently releasing the pressure, and then cooling the resulting assembly to room temperature.

References Cited in the file of this patent

UNITED STATES PATENTS

| | | |
|---|---|---|
| 2,196,579 | Reinhardt | Apr. 9, 1940 |
| 2,329,456 | Campbell | Sept. 14, 1943 |
| 2,352,705 | Garvey et al. | July 4, 1944 |
| 2,403,077 | Hershberger | July 2, 1946 |
| 2,545,370 | Mittelmann | Mar. 13, 1951 |
| 2,569,954 | Ruebensaal | Oct. 2, 1951 |
| 2,626,873 | Allen | Jan. 27, 1953 |

FOREIGN PATENTS

| | | |
|---|---|---|
| 875,277 | France | Sept. 14, 1942 |